Patented Oct. 9, 1928.

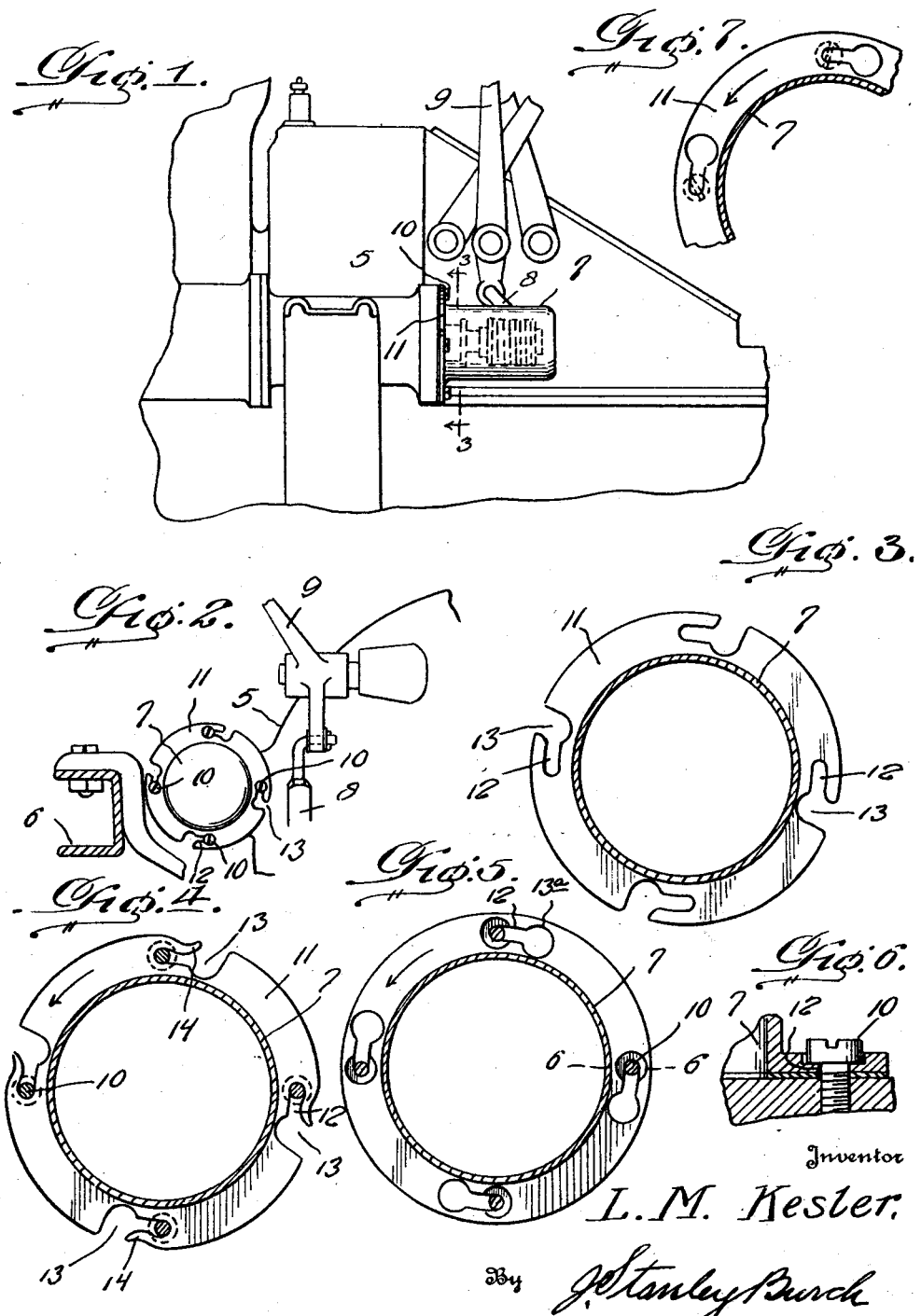

1,686,861

UNITED STATES PATENT OFFICE.

LAWRENCE M. KESLER, OF INDEPENDENCE, KANSAS.

BENDIX HOUSING.

Application filed May 10, 1927. Serial No. 190,235.

This invention relates to an improved housing for the bendix of electric starters, commonly employed to crank the engines of motor vehicles.

The primary object of the present invention is to provide a Bendix housing that may be readily applied and detached to facilitate inspection and repair of the bendix.

A more specific object is to modify the usual Bendix housing in a simple and inexpensive manner so that it may be attached by the usual bolts, and at the same time be readily applied and removed without requiring removal of the bolts.

A further object is to provide a construction for carrying out the above objects and in which simple and efficient provision is made to prevent accidental loosening and detachment of the housing due to vibration and the like.

Other objects will become apparent as the nature of the invention is better understood, and the same consists in the novel form, combination and arrangement of parts hereinafter more fully described, shown in the accompaying drawing and claimed.

In the drawing, wherein like reference characters indicate corresponding parts throughout the several views:

Figure 1 is a side elevational view of a Bendix housing, constructed in accordance with the present invention, attached to the transmission housing of a motor vehicle.

Figure 2 is an end elevation of the same, parts of the motor vehicle being broken away and in section.

Figure 3 is an enlarged transverse section of the housing detached, the line of section being indicated by the line 3—3 in Figure 1.

Figure 4 is a view similar to Figure 3, illustrating a modified form of the invention.

Figure 5 is a view similar to Figure 3, illustrating a further modification of the invention.

Figure 6 is an enlarged fragmentary section on line 6—6 of Figure 5, and

Figure 7 is a fragmentary view somewhat similar to Figure 3, showing a still further modification.

The Bendix housing of an electric engine starter now in common use on motor vehicles comprises a cap or shell closed at one end and having an annular external flange at its other end formed with radial slots or notches through which bolts pass to secure the cap to a portion of the vehicle. The location of the housing relative to parts of the vehicle and the location of the bolts, is such that access to the bolts for removal and application of the housing can only be had with difficulty, and as the bolts must be removed to detach the housing, removal and replacement of the housing involve tedious and time-consuming operations, even with the aid of special tools.

In the present invention the annular flange of the housing has arcuate circumferentially extending elongated slots enlarged sufficiently at corresponding ends to permit passage of the heads of the attaching bolts therethrough and of a width at their other ends to prevent such passage of the bolt heads although allowing passage of the bolt stems. In this way removal of the housing can be conveniently accomplished from above the bendix by slightly loosening the bolts and turning the housing about its axis until the heads of the bolts register with the enlarged ends of the slots, whereupon the housing may be readily moved axially away from the support or transmission housing until the heads of the bolts pass out through the enlarged ends of the slots. Conversely a reversal of the above operation will result in convenient application of the housing, the turning of the housing in the reverse direction resulting in location of the bolt heads outwardly of the narrow ends of the slots so that upon tightening the bolts, the housing will be securely attached.

Referring to the drawing, 5 indicates the Bendix housing support, such as a transmission housing, and 6 is the adjacent side rail of the motor vehicle frame. The Bendix housing 7 is supported in close proximity to and between the side rail 6 and the connection 8 from the clutch pedal 9 to the slow speed control of the vehicle, thus rendering the bolts 10, which secure the Bendix housing to its support, somewhat inaccessible.

The Bendix housing 7 comprises a sleeve or cap closed at one end and having an annular external flange 11 on the other end thereof provided with arcuate circumferentially extending elongated slots 12 through which the stems of the bolts 10 are adapted to freely pass. These slots 12 are sufficiently narrow at corresponding ends to prevent passage of the heads of the bolts 10 therethrough, so that when the bolts are tightened the housing is securely attached. The other ends of the slots 12 are enlarged, however, as at 13 sufficiently to permit passage of the bolt heads therethrough, thereby permitting ready removal of the housing upon loosening the bolts and turning the housing about its axis until the heads of all of the bolts are registered with the enlarged ends of the slots.

In view of the above, it will be seen that removal of the Bendix housing is greatly facilitated by the improvement herein shown and described, the operation, heretofore quite difficult and requiring complete removal of the bolts, being performed easily upon simply loosening the bolts slightly. Moreover, the present improvement can be readily incorporated in present housings or caps by simply re-forming or enlarging the slots or notches of the flanges thereof, thus avoiding discarding of caps already in use. The necessity of expensive multipart housings is also avoided.

When the prior housings are modified in accordance with the present invention, the enlarged ends of the slots will open through the outer edge of the flange 11 as in Figures 1 to 4, inclusive, and as shown in Figure 4 the free portions 14 of the flange 11 at the outer sides of the narrow portions of the slots 12 may be curved inwardly to form resilent catches behind which the stems of the bolts 10 are adapted to be snapped. In this way, accidental turning of the housing and its subsequent detachment is prevented, even though the bolts should vibrate loose.

When caps or housings are initially constructed in accordance with this invention, the well known form of keyhole slots may be provided as shown in Figures 5 to 7, inclusive, in which case the enlarged ends 13ª of the slots will not open through the edge of the flange.

In order to effectively guard against turning of the housing and its subsequent accidental detachment from vibration should the bolts become loosened slightly, the inner face of the flange 11 may be formed with circular recesses 15 at the narrow ends of the slots to receive the heads of the bolts in countersunk fashion, as shown in Figures 5 and 6.

Minor changes may be made without departing from the spirit and scope of the invention as claimed.

What I claim as new is:—

1. A Bendix cap comprising a one-piece elongated tubular body closed at one end and open at the other end, said body being provided on its open end with an integral external annular flange formed with spaced circumferentially extending elongated slots enlarged at corresponding ends, and means on the flange to cooperate with attaching bolts when engaged in the narrower ends of the slots to prevent accidental turning of the cap.

2. The combination with a support having securing bolts engaged therewith, of a Bendix cap having a slotted flange through which the bolts pass to attach the cap to the support, the slots being elongated circumferentially of the flange and enlarged at corresponding ends to permit passage of the heads of the bolts therethrough upon loosening of the bolts and turning of the cap, the slots opening through the outer edge of the flange at their enlarged ends, to define free flange portions at the outer sides of the narrower ends of the slots, said free flange portions being curved inwardly to form spring fingers behind which the stems of the bolts are adapted to be snapped upon turning of the cap into position for being secured by tightening of the bolts.

In testimony whereof I affix my signature.

LAWRENCE M. KESLER.